United States Patent [19]

Brennan

[11] Patent Number: 4,518,710

[45] Date of Patent: May 21, 1985

[54] CATALYST FOR THE REDUCTION OF NITROGEN OXIDES IN GASEOUS MIXTURES AND METHOD OF MAKING THE CATALYST

[75] Inventor: John F. Brennan, Des Plaines, Ill.

[73] Assignee: UOP Inc., Des Plaines, Ill.

[21] Appl. No.: 573,753

[22] Filed: Jan. 25, 1984

[51] Int. Cl.³ .................. B01J 21/06; B01J 23/22; B01J 23/30

[52] U.S. Cl. .................. 502/309; 502/312; 423/239

[58] Field of Search ............... 502/308, 312, 350, 353, 502/354; 309; 423/239 A

[56] References Cited

U.S. PATENT DOCUMENTS

| | | | |
|---|---|---|---|
| 4,048,112 | 9/1977 | Matsushita et al. | 423/239 X |
| 4,071,601 | 1/1978 | Shiraishi et al. | 423/239 |
| 4,085,193 | 4/1978 | Nakajima et al. | 423/239 |
| 4,093,561 | 6/1978 | Nishikawa et al. | 252/466 |
| 4,096,096 | 6/1978 | Nishikawa et al. | 252/466 |
| 4,117,081 | 9/1978 | Inaba et al. | 423/239 |
| 4,119,568 | 10/1978 | Nishida et al. | 252/437 |
| 4,119,703 | 10/1978 | Nishida et al. | 423/239 |
| 4,131,643 | 12/1978 | Utsunomiya et al. | 423/239 |
| 4,138,469 | 2/1979 | Kato et al. | 423/239 |
| 4,255,285 | 3/1981 | Engelbach et al. | 502/353 X |

FOREIGN PATENT DOCUMENTS 7514277  6/1976  Netherlands .................. 502/354

*Primary Examiner*—W. J. Shine
*Attorney, Agent, or Firm*—William H. Page, II; Louis A. Morris

[57] ABSTRACT

A catalyst useful for the reduction of nitrogen oxide comprising vanadium and, optionally, tungsten deposited on an inorganic oxide support, preferably titania. A precursor of the catalyst is treated with an acid from the group comprising the moderately strong organic acids and/or the strong mineral acids, excluding sulfuric acid and phosphoric acid, preferably following the deposition of the metal(s). Other aspects of the invention are a method of preparing the catalyst and a process for its use wherein a gaseous stream of nitrogen oxide and ammonia is contacted with the catalyst at reductive reaction conditions.

15 Claims, No Drawings

CATALYST FOR THE REDUCTION OF NITROGEN OXIDES IN GASEOUS MIXTURES AND METHOD OF MAKING THE CATALYST

BACKGROUND OF THE INVENTION

1. Field of the Invention

The field of art to which this invention pertains is the reductive removal of a nitrogen oxide from a gaseous stream. More specifically, this invention relates to a catalyst useful for such reductive removal, methods of manufacturing that catalyst and the process in which the catalyst is used.

2. Background Information

The effective removal of a nitrogen oxide contained in gaseous streams, particularly waste streams, from various combustion systems has become an important task in view of heightened public awareness of the problems and effects of air pollution. In rising to this task, a wealth of art has recently been published dealing specifically with nitrogen oxide removal. Examples of these publications are: U.S. Pat. Nos. 4,048,112; 4,071,601; 4,085,193; 4,093,561; 4,096,096; 4,117,081; 4,119,568; 4,119,703; 4,131,643 and 4,138,469.

A common teaching throughout the above publications is that a nitrogen oxide may be reductively removed from a gaseous stream by contacting the stream with a reductant such as ammonia in the presence of a supported metallic catalyst. Following is a tabulation of the above publications and representative compositions of respective catalysts disclosed by each:

| Publication U.S. Pat. No. | Catalyst |
| --- | --- |
| 4,048,112 | Vanadium oxide supported on the anatase form of titanium oxide. |
| 4,071,601 | Vanadium and tungsten oxide on an inorganic oxide support. |
| 4,085,193 | Titanium with possible metals including vanadium and tungsten on an inorganic oxide support. |
| 4,131,643 | The oxides of vanadium and niobium possibly with tungsten on an inorganic oxide support. |

With further regard to U.S. Pat. No. 4,085,193, in Example X-4 thereof, a catalyst comprising oxides of titanium, tungsten and vanadium was prepared in a manner that resulted in a sulfuric acid radical to also be present in the finished catalyst composition.

The present invention comprises an effective catalyst useful for the reductive removal of nitrogen oxides from a gaseous stream, a method for making the catalyst and the reductive removal process for using the catalyst, all involving a unique step of acid treating the precursor of the catalyst which results in a novel catalyst composition.

SUMMARY OF THE INVENTION

In one embodiment, the present invention is a catalyst composition useful for the reduction of nitrogen oxide comprising an inorganic oxide support having vanadium deposited thereon. A precursor of the catalyst is treated with an acid from the group comprising the moderately strong organic acids and/or the strong mineral acids, excluding sulfuric and phosphoric acids.

In another embodiment, the present invention is a method of manufacture of a catalyst composition useful for the reduction of nitrogen oxides, comprising vanadium on an inorganic oxide support. The method comprises depositing a salt of vanadium on the support from an aqueous solution of the salt and acid treating a precursor of the catalyst with an acid from the group comprising the moderately strong organic acids and/or the strong mineral acids, excluding sulfuric and phosphoric acids, by contacting the precursor with an aqueous solution of the acid.

In still another embodiment, the present invention is a process in which the catalyst of the first embodiment is used for the reduction of nitrogen oxides by contacting a gaseous stream containing the nitrogen oxides along with a reductant gas at reduction reaction conditions.

Other embodiments of the invention encompass details about catalyst compositions, methods of making the catalyst and reaction conditions for the reductive reaction in converting nitrogen oxides to nitrogen.

DESCRIPTION OF THE INVENTION

The basic chemical reactions effected by the process of the present invention are the catalyzed reduction of a nitrogen oxide to free nitrogen with ammonia at reductive reaction temperatures and pressures, and are represented by the following equations:

| | |
| --- | --- |
| $4NO + 4NH_3 + O_2$ | $4N_2 + 6H_2O$ |
| $6NO + 4NH_3$ | $5N_2 + 6H_2O$ |
| $6NO_2 + 8NH_3$ | $7N_2 + 12H_2O$ |

The reductive reaction is best effected at a temperature of from about 250° C. to about 450° C. Although pressure is not a critical factor in the process of this invention, the preferred pressure of the gaseous stream will be from about atmospheric to about 10 pounds per square inch gauge, which is the expected pressure range for the usual flue gas.

The source of the gaseous stream containing the nitrogen oxides, to be reductively removed by the process of this invention, will typically be an industrial flue gas, such as the flue gas from a power generating facility. These flue gases comprise, in varying relative amounts, a mixture of oxygen, water, sulfur oxides, nitrogen oxides and nitrogen. However, if lower operating temperatures are utilized (less than 300° C.), it is important that the flue gas contains very little oxides of sulfur.

Ammonia is added to and mixed with the gaseous stream prior to contact with the catalyst mixture. It is preferred that the quantity of ammonia added be sufficient to obtain a mole ratio of ammonia to nitrogen oxide of from about 0.75:1.00 to about 1.50:1.00.

The catalyst of the present invention requires a support material comprising an inorganic oxide. Alumina is a possibility for a support material, but titania (titanium dioxide) has been found to be the most effective. Titania may be of the anatase or rutile form, the crystal structure of the former being very loose, while that of the latter is relatively densely packed. Anatase is the preferred form of titania for use in the present invention.

Titania supports may be prepared from titanyl sulfate ($TiOSO_4.H_2SO_4.8H_2O$) which forms the favored anatase structure. Hydrolysis of the titanyl sulfate (preferably at from 60°–80° C.), provides a high surface area colloidal $TiO_2$ which is relatively easy to extrude after addition of the catalytic metals. The titanyl sulfate may also be neutralized with $NH_4OH$ to provide a gel, also in the anatase form. Gel titanias, however, are not as easily extruded.

In the method of manufacture of the catalyst of the present invention, a salt of vanadium and optionally one of tungsten is deposited on the support material in sufficient quantity to result in a finished catalyst from an aqueous solution, preferably having from about 0.5 wt. % to about 15 wt. % of vanadium on an elemental basis. Tungsten may be present in amounts even less than 0.5 wt. % on an elemental basis. It is preferred that the salts be sequentially deposited on the support by immersing the support in an aqueous solution of one salt, evaporating the solution to dryness (most effectively accomplished in a steam jacketed rotary evaporator), calcining the support, and repeating the immersion, drying and calcining with the aqueous solution of the other salt. In a particularly preferred embodiment, the salts are deposited on the support by the sequential steps of (a) immersing a powder (20–30 mesh) of the support in an aqueous solution of ammonium meta tungstate, (b) evaporating the solution to dryness, (c) calcining the tungsten containing support, (d) immersing the support in an aqueous solution of ammonium meta vanadate and a sufficient amount of a weak reducing agent (e.g., oxalic acid) to reduce the oxidation state of the vanadium from +5 to +4, (e) evaporating the solution to dryness, and (f) calcining the metals containing support.

An essential step in preparing the catalyst of the present invention is the acid treatment of the catalyst precursor with an acid from the group comprising the moderately strong organic acids and/or the strong mineral acids, excluding sulfuric acid and phosphoric acids, most preferably following the deposition of the salts. Examples of appropriate moderately strong organic acids are acetic, formic and propionic acids. Sulfuric and phosphoric acids are specifically excluded from the practice of the present invention because they are known to be relatively ineffective. The precursor is contacted with an aqueous solution of the acid and calcined as a final step. The most preferred method of acid treatment is mixing a powdered precursor of the catalyst in a concentrated aqueous solution of the acid at a temperature of from about 60° C. to about 200° C. and with an amount of acid which provides from about 0.05 to about 0.60 moles of hydrogen ions per mole of inorganic oxide in the precursor and then drying and calcining the mixture. The time of contacting for the acid and precursor is not critical, the time required for obtaining a homogenous mixture usually being sufficient.

Although not limiting the present invention to a particular hypothesis, it is believed that the acid treating of the inorganic oxide with some acids may provide a better epitaxial fit between the interface of crystals of the inorganic oxide and metal deposited thereon, e.g., the 010 face of $V_2O_5$ and 001 face of the anatase form of $TiO_2$. It is postulated that this better epitaxial fit provides a more active catalyst for reducing nitrogen oxides with ammonia. When an improper acid is used, i.e., sulfuric or phosphoric, the beneficial effect is counteracted by the poisoning of the catalyst through deposit on it of a sulfate or phosphate residue which results in a less active catalyst.

The acid treating step of the present invention may have further utility in providing an excellent mechanism for agglomerating the catalyst powder into large particles of desired size and shape. The amount of water in solution with the acid should be just enough to form a thick paste of acid and precursor mixture. Prior to drying and calcining, this paste may be extruded. The extrudate is then dried and calcined followed by being broken and ground to the desired particle sizes.

Alternatively, the catalyst precursor may be left as a powder during the acid treatment and final drying and calcining. This powder may then be slurried with water and the slurry used to coat a ceramic monolith which is then dried and calcined.

Calcining, wherever effected in the above method of manufacture of the catalyst of the present invention, is preferably carried out at a temperature of from about 300° C. to about 600° C. One effect of such calcination following the acid treating step is that any acid function present in the catalyst precursor is decomposed. This further distinguishes the catalyst composition of the present invention from that of aforementioned U.S. Pat. No. 4,085,193 which requires that an acid radical be present in the finished catalyst composition.

The following non-limiting examples are given by way of illustration only.

In the following examples, a bench scale apparatus was constructed to simulate an industrial process for the reductive removal of a nitrogen oxide from a flue gas. The catalyst used was packed in a vertical column. The column diameter was ⅜″ I.D. and in all cases 0.5 gr of catalyst as a 20–30 mesh powder was used. All catalyst tested contained 10 wt. % tungsten and 2.8 wt. % vanadium. The flue gas was passed upwardly through the column thereby effecting contact between the nitrogen oxide and catalyst. The flue gas was heated to a desired initial temperature in a gas preheater prior to contact with the catalyst.

A simulated flue gas with ammonia was prepared which comprised:

| Gas | Concentration |
|-----|---------------|
| NO | 400 ppm |
| $NH_3$ | 400 ppm |
| $O_2$ | 3.6% |
| $CO_2$ | 5.2% |
| $SO_2$ | 1,000 ppm |
| $H_2O$ | 10.3% |
| $N_2$ | balance |

EXAMPLE I

A first series of tests were run on various catalysts either obtained commercially or using supports comprising different sources of titania. The source designated "$C_1$" was purchased from a commercial supplier as a finished catalyst except for the acid treatment steps of the present invention. The source designated "$C_2$" used a support comprising a commercial titania derived from flame oxidized titanium tetrachloride. The source designated "$C_3$" used a support comprising 1/16″ spheres of titania bound with clay and ground to 20–30 mesh. Other sources are given in terms of the compound of titanyl sulfate ($TiOSO_4$ or $Ti(SO_4)_2$) used as the starting material and whether it was precipitated (ppt.) or hydrolyzed (hyd.) to obtain the support. All titanias were in the anatase form.

All catalysts in the following tests were, except for those catalysts not acid treated, prepared in accordance with the method of the present invention including the sequential steps of tungsten deposition, vanadium deposition and acid treating, each step followed by drying and calcining at 540° C.

| Test No. | Ti Source | TiO$_2$ Form | Initial Calcining of Support (3 hr.) | Ag-glom-eration | Mole Ratio H+ TiO$_2$ | Conversion @ 400° C. |
|---|---|---|---|---|---|---|
| 1 | C$_1$ | — | — | — | — | 65.7 |
| 2 | C$_1$ | — | 540 | — | — | 68.1 |
| 3 | C$_1$ | — | — | — | — | 63.9 |
| 4 | TiOSO$_4$ | ppt. | 250 | HNO$_3$ | .3 | 68.2 |
| 5 | TiOSO$_4$ | ppt. | 250 | HNO$_3$ | .3 | 64.4 |
| 6 | Ti(SO$_4$)$_2$ | hyd. | 675 | *CA | — | 49.4 |
| 7 | C$_1$ | — | — | *CA | — | 42.5 |
| 8 | TiOSO$_4$ | ppt. | 250 | none | — | 37.9 |
| 9 | TiOSO$_4$ | hyd. | dried | none | — | 29.4 |
| 10 | C$_1$ | — | 540 | HNO$_3$ | .3 | 74.9 |
| 11 | C$_1$ | — | — | — | — | 63.8 |
| 12 | C$_2$ | — | 540 | HNO$_3$ | .07 | 48.6 |
| 13 | TiOSO$_4$ | hyd. | 540 | HNO$_3$ | .07 | 67.4 |
| 14 | TiOSO$_4$ | ppt. | 540 | HNO$_3$ | .07 | 61.0 |
| 15 | C$_2$ | — | 540 | HNO$_3$ | 0.3 | 59.6 |
| 16 | **C$_3$ | — | 540 | HNO$_3$ | 0.3 | 45.3 |
| 17 | ***C$_3$ | — | 540 | HNO$_3$ | 0.5 | 16.3 |

*Cellulose Acetate
**Catalyzed as 1/16" sphere and ground to powder
***Ground to powder and then catalyzed The most important observation from the above data is the pronounced effect of the acid treating step. For example, source "C$_1$", which provides a high conversion even as obtained without further treatment (tests 1 and 3), and a higher conversion when calcined (test 2), yields a significantly highest conversion when acid treated (test 10). Cellulose acetate agglomerated catalyst from source "C$_1$" (test 7) demonstrated an even lower activity than the untreated material (tests 1 and 3). Higher concentrations of acid during the acid treating step produced catalysts of higher activity, e.g., test 12 as compared to test 15.

The decreased activity of the clay bound materials (tests 16 and 17) is attributed to the presence of the clay, but this hypothesis has not been verified because the material is not available without the clay binder.

EXAMPLE II

In this example, tests were run to determine the effect of the type of acid used in treating various catalyst precursors having the above "C$_2$" as the source of titania. Except for the type and amount of acid used, the preparation of all catalysts was the same and in accordance with the method of the present invention. The following data was obtained:

| Acid Treatment | Mole Ratio H + TiO$_2$ | % NO Conversion at 400° C. |
|---|---|---|
| HNO$_3$ | .3 | 59.6 |
| HCl | .3 | 59.7 |
| H$_2$SO$_4$ | .3 | 53.2 |
| HNO$_3$ | .07 | 48.6 |
| H$_3$PO$_4$ | .3 | 22.3 |
| CH$_3$—COOH | .3 | 66.9 |

It is clear from the above data that the acid treatment in accordance with the present invention, i.e., use of the acids HNO$_3$, HCl and CH$_3$—COOH (acetic), results in catalyst having a pronounced higher NO conversion activity. It may also be again observed, with regard to the two tests using HNO$_3$, that the greater quantity of acid results in higher NO conversion activity.

EXAMPLE III

In this example, the effect of the placement of the acid treating steps was studied using catalysts of the present invention having titania supports derived from the above "C$_2$". Following is the data obtained:

| Description | Mole Ratio H+/TiO$_2$ | % NO Conversion at 400° C. |
|---|---|---|
| Strong HNO$_3$ Treatment After the W and Before the V Impregnation | 1 | 52.3 |
| Weak HNO$_3$ Treatment Before the W and V Impregnation | .3 | 45.0 |
| Strong HNO$_3$ Treatment Before the W and V Impregnation | 1 | 52.8 |
| Strong HNO$_3$ Treatment After the W and V Impregnation | 0.5 | 57.5 |

The above data illustrates that the highest NO conversion activity catalyst obtained was that prepared by acid treatment following the W and V impregnation, even when the quantity of acid (H+/TiO$_2$) used was one-half that used in the tests where acid treatment was effected prior to V impregnation.

EXAMPLE IV

In this example the effect of some organic acids was studied with only vanadium (1.6 wt. % on an elemental basis) deposited on the above "C$_2$" titania. Following is the data obtained:

| Description | Mol Ratio H+/TiO$_2$ | % NO Conversion at 400° C. |
|---|---|---|
| Propionic acid after the V impregnation | 0.2 | 82.4 |
| Acetic acid after the V impregnation | 0.2 | 77.2 |
| Formic acid after the V impregnation | 0.2 | 79.3 |

The above data indicates that the formic acid propionic are as effective as acetic acid for activating these V-TiO$_2$ catalysts. The organic acids can activate these catalyst systems without the very low pH conditions that are required for the strong mineral acids.

I claim as my invention:

1. A catalyst composition useful for the reduction of nitrogen oxide comprising an inorganic oxide support having tungsten and vanadium deposited thereon, said support having been treated, before or after the deposition of either of said tungsten or vanadium thereon, with a strong mineral acid, excluding sulfuric and phosphoric acids.

2. The catalyst composition of claim 1 wherein said inorganic acid comprises titania.

3. The catalyst composition of claim 1 wherein said acid is nitric acid.

4. The catalyst composition of claim 1 wherein the content of vanadium in said catalyst is from about 0.5 wt. % to about 15 wt. % on an elemental basis.

5. The catalyst composition of claim 1 wherein said acid treatment is effected at a temperature of from about 60° C. to about 200° C. and with an amount of acid which provides from about 0.05 to about 0.60 moles of hydrogen ions per mole of inorganic oxide.

6. A method of manufacture of a catalyst composition useful for the reduction of nitrogen oxides comprising tungsten and vanadium on an inorganic oxide support, said method comprising depositing a salt of vanadium and a salt of tungsten on said support from an aqueous solution of said salt, thereafter acid treating the resultant tungsten and vanadium-containing support with an acid from the group comprising the strong mineral acids, excluding sulfuric acid and phosphoric acid, by contacting said tungsten and vanadium-containing support with an aqueous solution of said acid, and then drying and calcining the acid treated support.

7. The method of claim 6 wherein said salts are sequentially deposited on said support by immersing said support in an aqueous solution of one salt, evaporating the solution to dryness, calcining the support, and repeating the immersions, drying and calcining with the aqueous solution of the other salt.

8. The method of claim 1 wherein said acid is nitric acid.

9. The method of claim 6 wherein the tungsten salt is deposited prior to the deposition of the vanadium salt.

10. The method of claim 9 wherein said salts are deposited on said support by the sequential steps of (a) immersing a powder of said support in an aqueous solution of ammonium meta tungstate, (b) evaporating said solution to dryness, (c) calcining the tungsten containing support, (d) immersing the support in an aqueous solution of ammonium meta vanadate and a sufficient amount of a weak acid to reduce the oxidation state of the vanadium ion from +5 to +4, (e) evaporating the solution to dryness, and (f) calcining the metals containing support.

11. The method of claim 6 wherein said acid treatment is effected with a concentrated aqueous solution of said acid at a temperature of from about 60° C. to about 200° C. and with an amount of acid which provides from about 0.05 to about 0.60 moles of hydrogen ions per mole of inorganic oxide in the support, and then drying and calcining said support having vanadium and tungsten deposited thereon to produce said resultant catalyst composition.

12. The method of claim 11 wherein the temperature of said calcining step is from about 300° C. to about 600° C.

13. The method of claim 11 wherein the amount of water in solution with said acid is just enough to form a thick paste of acid and support and prior to drying and calcining said support and acid, the paste is extruded, the extrudate being dried and calcined and then broken and ground to the desired particle sizes.

14. The method of claim 11 wherein said support with tungsten and vanadium deposited thereon is present in the form of a powder after drying and calcining, said powder then being slurried with water and the slurry then being used to coat a ceramic monolith which is then dried and calcined.

15. A method of manufacture of a catalyst composition useful for the reduction of nitrogen oxides comprising vanadium and tungsten on an inorganic support, said method comprising acid treating said inorganic oxide support with an aqueous solution of a strong mineral acid, excluding sulfuric acid and phosphoric acid, thereafter depositing a salt of vanadium and a salt of tungsten on said acid-treated support from an aqueous solution of said salt of said vanadium and salt of tungsten and then drying and calcining said acid-treating vanadium-containing and tungsten-containing support to form said catalyst composition.

* * * * *